United States Patent [19]

Grannen, III

[11] Patent Number: 4,576,568
[45] Date of Patent: Mar. 18, 1986

[54] INJECTION MOLD WITH THIN WALL HOLE FORMING MEANS

[75] Inventor: Walter A. Grannen, III, Bargersville, Ind.

[73] Assignee: E-W Mold & Tool Company, Inc., Indianapolis, Ind.

[21] Appl. No.: 705,130

[22] Filed: Feb. 25, 1985

[51] Int. Cl.⁴ .................... B29C 1/06; B29F 1/022
[52] U.S. Cl. ........................... 425/577; 425/468; 425/588; 425/DIG. 5; 249/64
[58] Field of Search .......... 425/468, 577, 588, DIG. 5

[56] References Cited

U.S. PATENT DOCUMENTS

3,473,197 10/1969 Wilds et al. ................... 425/577
3,564,660 2/1971 Darnell ..................... 425/468 X
4,278,417 7/1981 Wilds et al. .................. 425/DIG. 5
4,481,161 11/1984 Grannen ...................... 425/468 X Primary Examiner—J. Howard Flint, Jr.
Attorney, Agent, or Firm—Woodard, Weikart, Emhardt & Naughton

[57] ABSTRACT

A mold assembly for producing a plastic container having internal compartments separated by partitions. A male mold is slidably moveable into a female mold and includes a plurality of upstanding cores to form the container with injectors provided to force plastic melt between the molds and between the cores. A plurality of side locking members are reciprocably mounted in the cores and when extended contact adjacent cores limiting relative motion therebetween. The locking members form holes in the partitions formed between the cores. The locking members are withdrawn only after the plastic melt is cooled.

15 Claims, 7 Drawing Figures

INJECTION MOLD WITH THIN WALL HOLE FORMING MEANS

BACKGROUND OF THE INVENTION

This invention is in the field of injection molding and associated tools. In two prior U.S. Pat. Nos. 4,278,417 and 4,481,161, I disclosed a mold asembly for the production of a thin walled multi-partitioned container such as a battery case. In a typical battery case, a half a dozen compartments will be formed in the case with each compartment separated from the adjacent compartment by a thin wall to separate the electrical cells. The thin wall partitions are produced by providing a plurality of upstanding cores on a male mold which is then inserted into the female mold and the plastic injected between the two molds and between the cores. Traditionally, movement of the cores has been a problem due to the high pressures required to achieve the desired amount of plastic flow. Thus, in the first aforementioned patent, there are disclosed a plurality of internal core locking members to lock together the distal ends of the cores limiting relative motion therebetween. In the second aforementioned patent, a plurality of wedges are disclosed mounted to the female mold with the wedges projecting down between the distal ends of the cores again locking the cores together and limiting relative motion.

Once a container such as a battery case is produced by injection molding, it is then necessary to punch holes in the thin walled compartment separators in order to connect adjacent cells for an electric current. Such a punch operation is another step in the manufacturing process adding expense and time required to produce the final product. It is therefore desirable to form these holes during the injection molding of the container thereby eliminating the punching step. Disclosed herein is a mold assembly which will form the interior partition holes. Simultaneously with the formation of the partition holes, it is also desirable to further lock together the upstanding cores in the male mold in order to prevent relative motion between the cores. This is particularly true in the area surrounding the formed holes since the thickness of the surrounding partition must accurately be controlled to enable the proper electrical cell interconnection. The mold assembly disclosed herein provides such an interlocking core feature thereby providing for accurate control of the wall thickness immediately adjacent the formed holes.

SUMMARY OF THE INVENTION

One embodiment of the present invention is a case mold assembly comprising a frame, a female mold mounted on the frame and having a cavity for the plastic injection molding of a case, a male mold mounted on the frame and positionable into the female mold for the formation of the case therebetween, the male mold including a plurality of cores located apart forming spaces, the cores having bottom ends mounted to the frame with the cores extendable into the cavity to form walls extending interiorly across the battery upon the plastic injection, injection means operable to inject molten plastic between the female mold and the male mold and also into the spaces and to maintain the plastic under pressure for a specified time period, a plurality of lifters slidable mounted to the cores and extending into the cavity, a plurality of pins mounted to the lifters and extending laterally across the spaces toward adjacent cores forming holes through the interior walls as the spaces between cores are filled with plastic, and pin control means associated with the cores, the lifters and the pins being operable to cause the pins to extend outwardly into the spaces to form the holes within the walls and to allow the pins to withdraw from the spaces upon expiration of an additional time period subsequent to the specified time period.

Another embodiment of the present invention is a separable mold assembly for injection molding a plastic container having compartments separated by thin walls comprising a male mold with deep longitudinal slots extending transversely thereacross forming a plurality of upstanding cores to form the compartments separated by the thin walls, a female mold mounted adjacent the male mold but spaced therefrom to form the container therebetween, a plurality of pins mounted to the male mold and movable into the slots once the male mold is positioned in the female mold with the pins extending between and contacting adjacent cores limiting relative motion between adjacent cores and also forming holes in the thin walls when the slots are filled with plastic, a plurality of wedge shaped fingers mounted to the female mold and movable into the slots as the female mold closes on the male mold to cooperatively with the pins limit relative motion between the cores, and injector means mounted to the female mold and aligned relative to the cores to inject plastic material under pressure into the slots and between the female mold and the male mold, and control means associated with the pins and the cores and being operable to move the pins out of the slots once the holes are formed and a time delay period has elapsed subseqent to the injector means finishing the injection of plastic material into the slots.

An additional embodiment of the present invention is a mold assembly adapted for the injection molding of thin-walled multi-partitioned containers comprising a cavity member, a plurality of cantilever-mounted array of cores extending into the cavity member, injection means on the cavity member and adjacent the free ends of the cores for injection of plastic material into spaces between the cores and between the cavity member and the cores, internal core locking members reciprocally moveable in transverse bores formed in the cores intermediate their ends, the members being moveable within their bores from a retracted position substantially flush with the side faces of their respective cores to an extended position in locking engagement with the side faces of the next adjacent core limiting relative motion between adjacent cores while forming through holes in walls formed between the cores, and time delay means associated with the locking members and the injection means to delay retraction of the locking members until the plastic injection between the cores will not flow into the holes upon removal of the locking members.

It is an object of the present invention to provide a new and improved mold assembly for the injection molding of containers having interior thin walled partitions.

A further object of the present invention is to provide a mold assembly having a plurality of stabilized male cores.

An additional object of the present invention is to provide a mold assembly for producing a multi-partitioned container having holes formed in the interior partitions each with a controlled wall thickness.

3

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
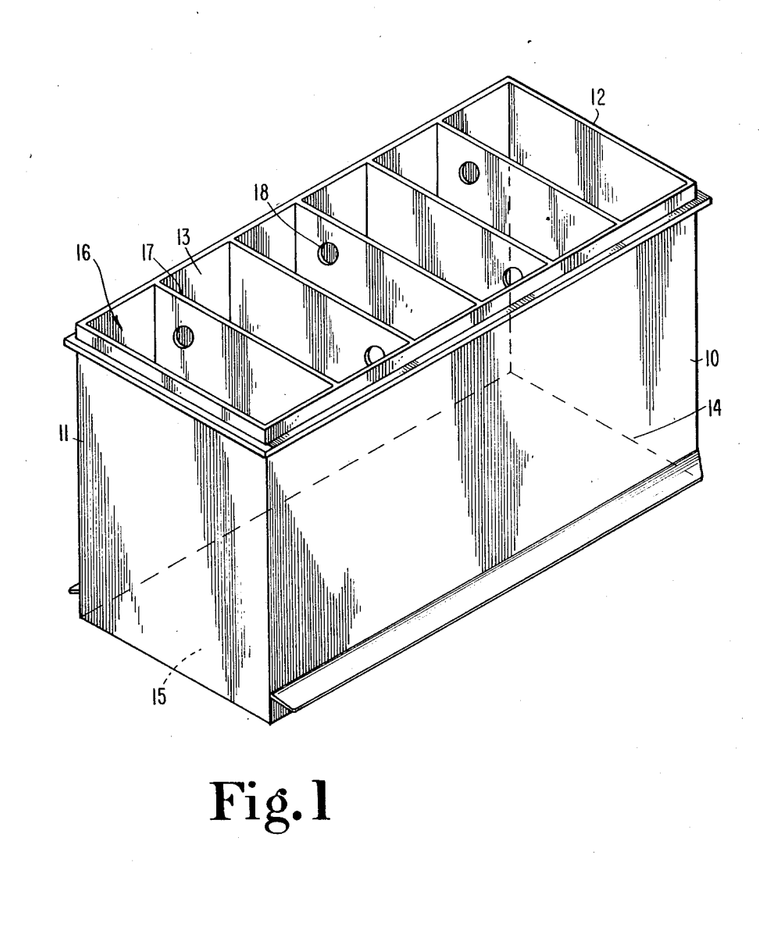
FIG. 1 is a perspective view of a container produced by the injection mold and method disclosed herein.

Referring now more particularly to FIG. 1, there is shown a container 10 produced from polyolefin having a pair of end walls 11 and 12 integrally joined to a pair of side walls 13 and 14 as well as a bottom wall 15. A plurality of compartments 16 are formed within the container and separated by thin walled patitions 17. In the embodiment shown in FIG. 1 the container includes six compartments separated by partitions 17 with holes 18 formed in the partitions.

The male mold 20 (FIG. 2) is sized to fit slidably into the female mold 32 (FIG. 3) being spaced therefrom in order to form end walls 11 and 12 along with side walls 13 and 14 and a bottom wall 15. The male mold includes six cores 21-26 to form six compartments shown in container 10. The cores are spaced apart forming slots 27-31 to form the five partitions 17.

Figure 4:
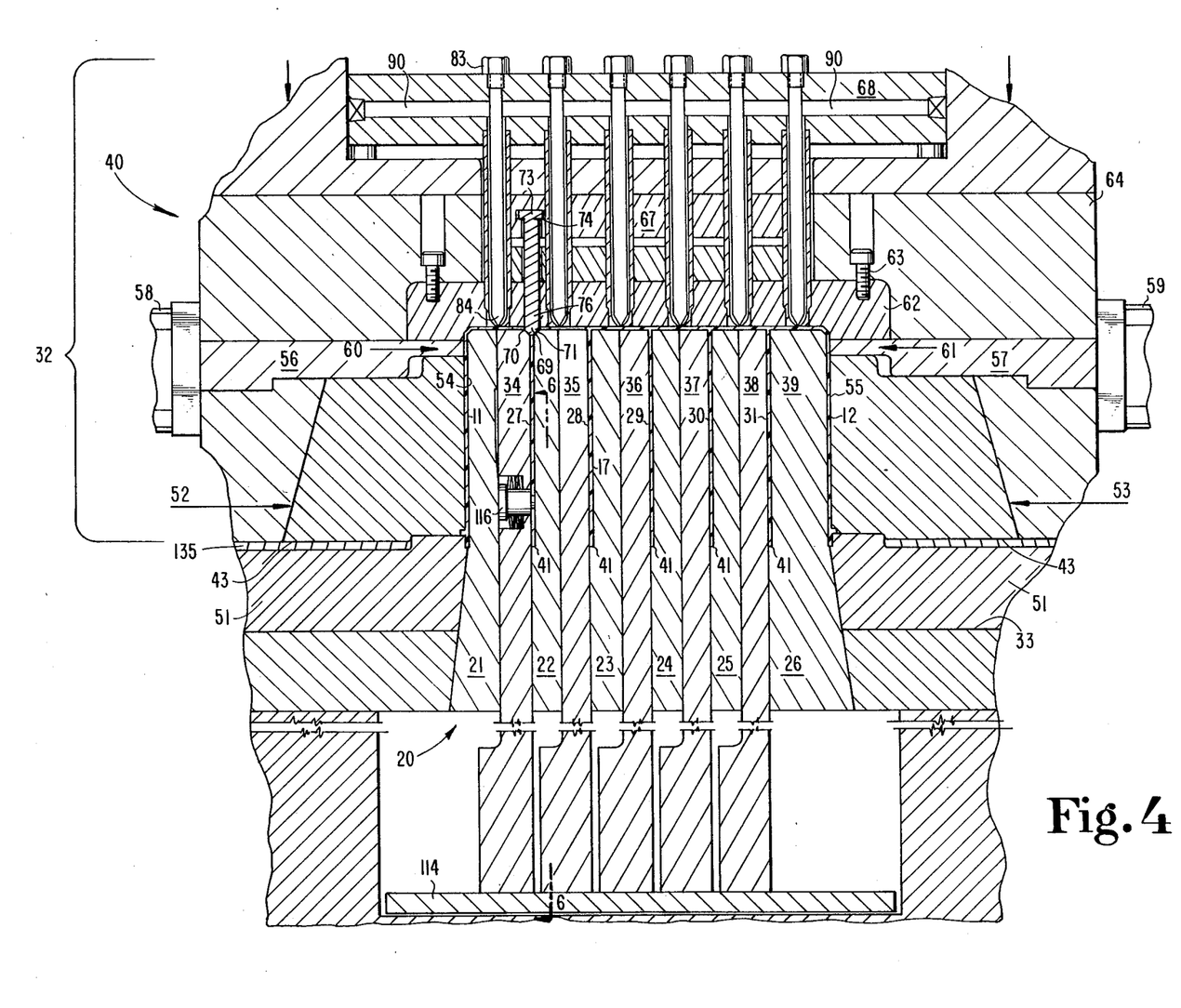
FIG. 4 is an enlarged fragmentary cross-sectional view taken along the line 4—4 of FIG. 3 and viewed in the direction of the arrows with the male mold shown inserted into the female mold.

The mold assembly 40 includes the male mold 20 and female mating mold 32 (FIG. 4). Mold 40 is identical with the mold disclosed in my U.S. Pat. No. 4,481,161 which is herewith incorporated by reference, with the exception that the male mold includes six cores each of which is separated apart from the adjacent core by the wedge shaped projections for engaging the top distal ends of the cores and with the exception that the location of the injectors for injecting the plastic material into the mold are located centrally atop each separate core. Further, the mold assembly disclosed herein includes additional locking pins for the cores for spacing the cores apart while at the same time forming a hole in the interior partition of the formed container.

Figure 2:
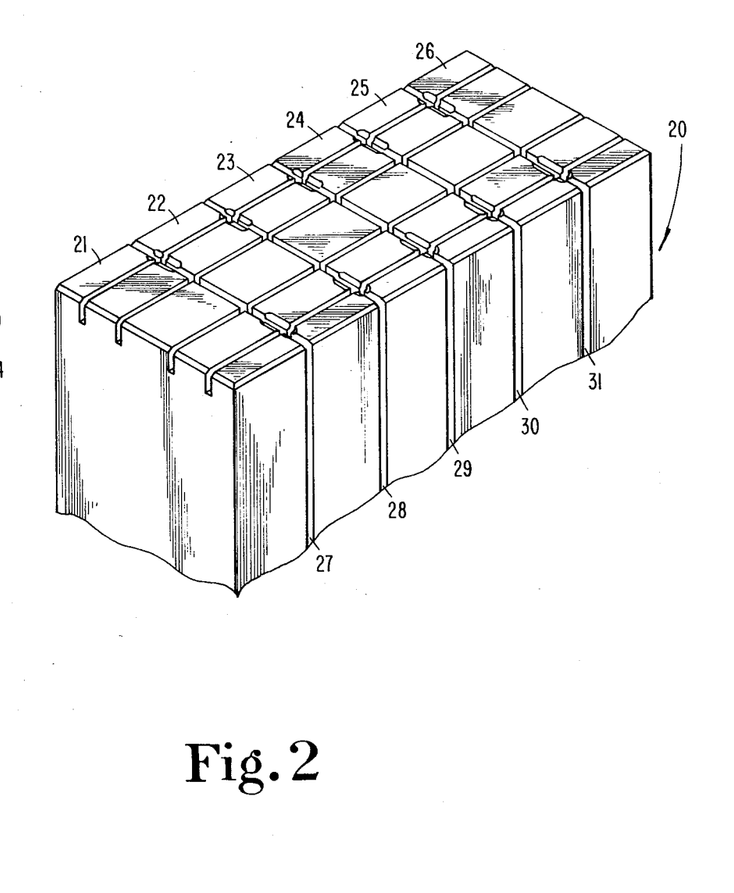
FIG. 2 is a fragmentary perspective view of the cores provided on the male injection mold.

Mold 20 includes six cores 21, 22, 23, 24, 25 and 26 having bottom ends fixedly mounted in cantilever fashion to a base 33. The top distal ends 34-39 of the six cores are spaced apart forming the slots 27-31 for forming the partitions 17 separating compartments 16. Slots 27-31 terminate at location 41 forming the upper edge portion of each paartition 17. Each core is in contact with an adjacent core from location 41 to the base 33 forming a rigid bottom portion of the male mold whereas the top distal ends when not positioned within the female mold are movable when large sideways pressure is exerted thereon.

Female mold 32 includes a pair of cavity side cams 43 slidably atop wear plates 135 (FIG. 4) on stripper plates 51 and are movable inwardly in the direction of arrows 52 and 53 until they are slightly spaced apart from the cores forming gaps 54 and 55 in which the end walls 11 and 12 of the container are formed. Female mold 32 further includes side locking members 56 and 57 mounted respectively to hydraulic cylinders 58 and 59 to move inwardly in the direction of the arrows 60 and 61 to engage the outermost surface of the top distal ends 34 and 39 preventing outward movement of the cores. The side cams 43 as well as the side locking members 56 are disclosed in my U.S. Pat. No. 3,473,197 and operate in the same manner.

Figure 5:
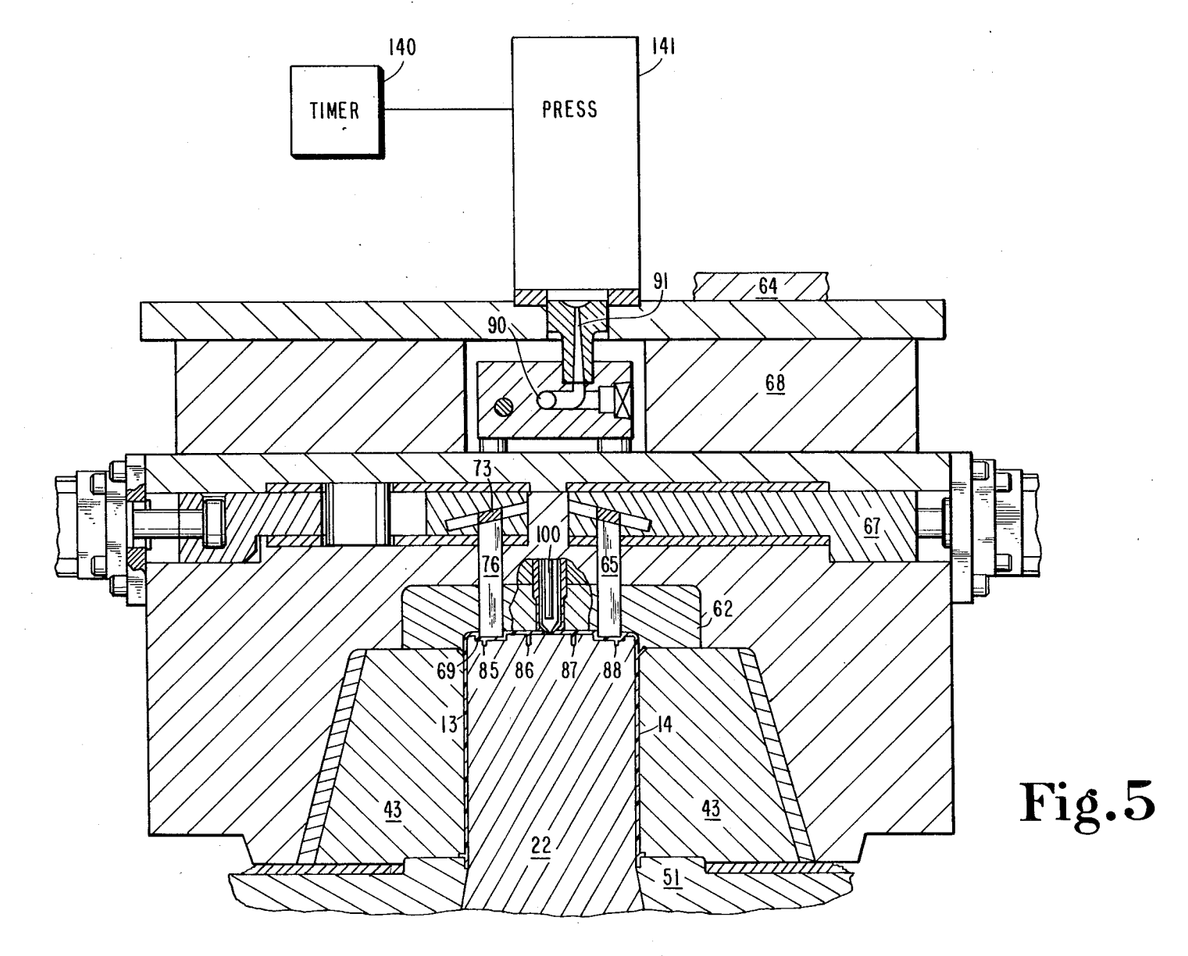
FIG. 5 is an enlarged fragmentary cross-sectional view taken along the line 5—5 of FIG. 3 and viewed in the direction of the arrows with the male mold inserted into the female mold.

Female mold 32 further includes a cavity insert 62 (FIG. 4) fixedly mounted by conventional fastening devices 63 to plate 64 of the mold 32. A plurality of locks 65 (FIG. 3) and injectors 100-105 are mounted respectively to plates 67 and 68 (FIG. 5) in turn secured to plate 64. Locks 65 have wedge shaped bottom ends 69 fittable into the slots located between each adjacent core with the top edges 70 and 71 (FIG. 4) of each core being beveled to complementarily receive the wedge shaped ends of the locks. The top end of each lock 65 includes an enlarged head 73 fitted within a cavity 74 provided in plate 67.

In the embodiment shown in FIG. 4, the locks are arranged in pairs and positioned in every slot. For example, a pair of locks 76 and 65 are shown in FIG. 3 as being arranged for slot 27 shown by the phantom lines whereas additional pairs of locks are arranged to extend to the remaining slots such as shown by locks 78 and 79 (FIG. 3) positioned into slot 29.

Figure 3:
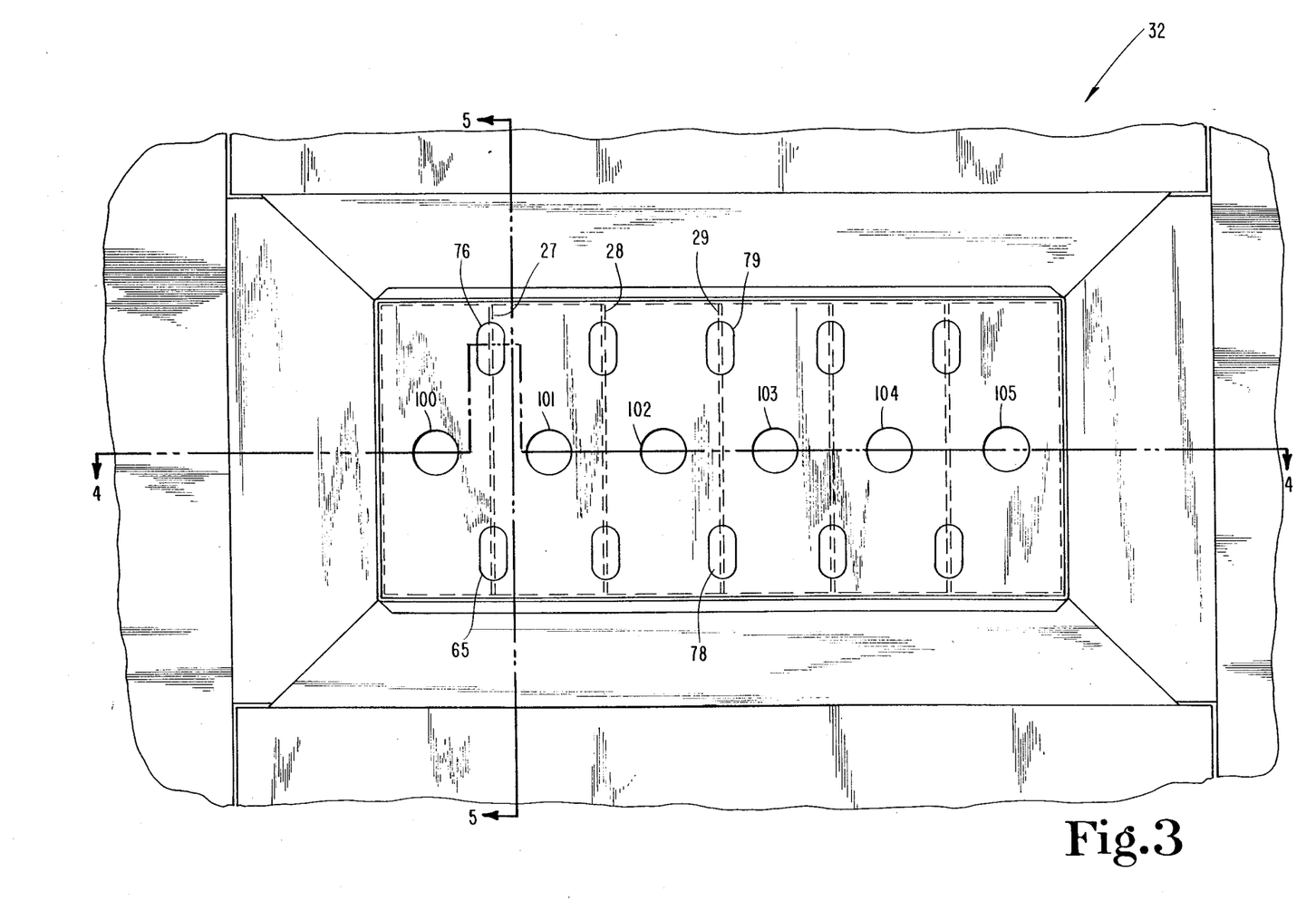
FIG. 3 is a fragmentary bottom view of the female injection mold.

Six injectors 100-105 are positioned each over the center of each core (FIG. 3). Each injector has a top end fixedly secured by threaded bushings 83 (FIG. 4) to plate 68. The bottom outlet end 84 of each injector opens over the centerline of the top of the core to allow plastic material to be injected into the mold and more specifically between the male and female mold and between the slots adjacent each core. A plurality transverse channels 85-88 (FIG. 5) extend across the cores allowing formation of ribs to support the battery cells off the bottom of the box.

Each injector is in fluid communication with the source of pressurized fluid via a passage 90 (FIG. 5) extending through plate 68 thereby ensuring that each injector applies the same pressure to the mold assembly. Passage 90 in turn is in fluid communication with passage 91 in turn connected to the external source of plastic melt with the flow controlled by timer 140 of press 141. The construction of the injectors, female mold and locks are identical to that previously described in U.S. Pat. No. 3,473,197with the exception of the location of the locks and injectors. Thus, as described in U.S. Pat. No. 3,473,197 the top ends 73 of the locks are engaged by a slide mechanism 67 (FIG. 5) in turn activated by hydraulic cylinder to vertically move the locks to and from a position between adjacent cores.

The embodiment shown in the drawing as compared to my prior designs disclosed in my aforementioned U.S. patents includes additional side locking means limiting relative motion between adjacent cores while at the same time forming holes extending through partitions to allow cells within adjacent compartments to be electrically connected together. The additional side locking members are activated by lifters slidably mounted in the side surface of the cores. One such lifter and side locking member will now be described it being understood that an identical description applies to the remaining lifters and side locking members.

Figure 6:
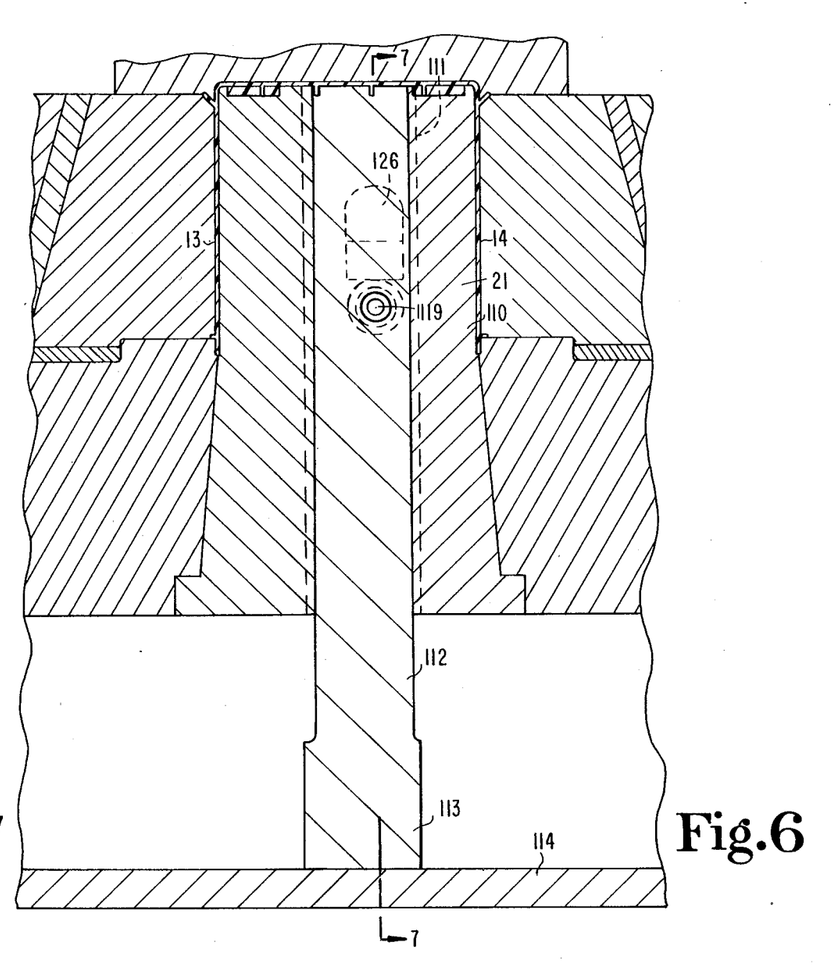
FIG. 6 is an enlarged fragmentary cross-sectional view taken along the line 6—6 of FIG. 4 and viewed in the direction of the arrows showing one of the lifters and pins slidably mounted to one of the cores.

The side surface of core 21 facing core 22 includes a slot or track 111 slidably receiving a lifter 112 having a bottom end 113 fixedly mounted to a floating plate 114 in turn mounted to the frame of the apparatus. The longitudinally extending edges of lifter 112 mate with the longitudinally extending edges of slot 111 in a tongue and groove fashion to allow the lifter to be guided as it is moved vertically and to prevent accidental disengagement of the lifter relative to the core.

The additional side locking member or pin 116 is reciprocally mounted in lifter 112 and moves lateral with respect to the length of the lifter. Pin 116 includes a head 117, a cylindrical main body 118 and a reduced diametered outer end 119. End 119 contacts the adjacent core forming a hole in the partition formed between adjacent cores whereas the vertical surface of main body 118 provides along with the length of end 119 a means for controlling the thickness of the partition surrounding the formed hole. The lifter includes a counter bore shaped hole 120 with the enlarged portion of the hole receiving head 117 along with two pairs of spring washers 122 and 121 through which the cylindrical main body 118 of the pin extend. Less or more than two pairs of washers may be utilized. Each pair of washers includes two mutually opposed bowl shaped washers. For example, pair 121 includes washer 123 and washer 124 which are mutually opposed having their circumferential edges in contact and their center portions spaced apart forming a spring with the washers being compressible in the center section of each washer allowing the pin to move in the direction of arrow 134 when the springs expand. Pair 121 contacts pair 122 at their center section with the spacing between head 117 and stop surface 125 of the hole being such so as to receive both pairs 121 and 122 while at the same time requiring the distal end 119 of the pin to extend outwardly from the side surface of core 21 and contact the mutually facing side surface of core 22 thereby providing a locking member extending between the two cores.

A recess 126 is formed in core 21 and is sized to receive the enlarged head 117 of the pin when the lifter 112 moves upwardly and aligns the head with recess 126 allowing pairs of spring washers 121 and 122 to retract the pin disengaging distal end 119 from core 22.

A separate lifter with associated locking pin is provided in each slot 27–31. The distal end of each pin forms the through hole 18 (FIG. 1) extending through each partition. The electrical cells are connected together in a zig zag fashion. That is, the through hole 18 located in the first partition is positioned close to side wall 13 whereas the through hole in the next partition is positioned near side wall 14 with the remaining through holes positioned alternatively adjacent each side wall 13 and 14. Thus, only a single pin is shown in FIG. 4 due to the nature of the cross section.

Side surface 115 of lifter 112 is indented at location 130 to receive the bottom edge of the partition with that portion of the lifter being indented above location 130 to receive the container partition and with the portion below location 130 being positioned against the side surface of core 22. Likewise, core 22 is indented above location 130 to receive the container partition.

Figure 7:
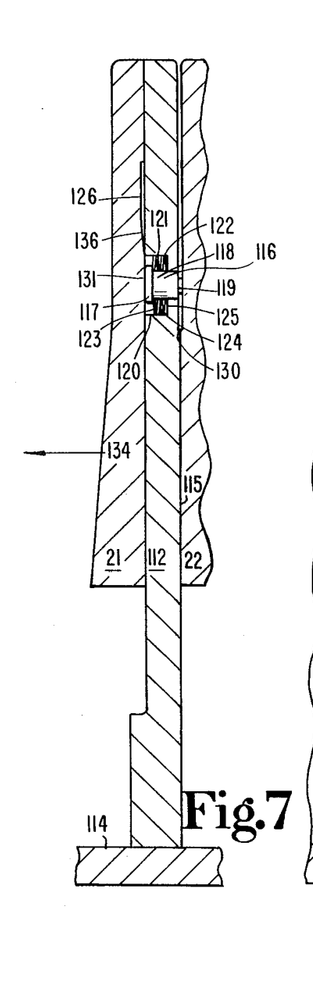
FIG. 7 is a fragmentary cross-sectional view taken along the line 7—7 of FIG. 6 and viewed in the direction of the arrows showing the locking pin engaged with an adjacent core.

In operation, once the male mold and female mold have closed together and the top pairs and side pair of locking members have engaged the top distal ends of the cores along with the lifters being positioned to cause the additional locking members or pins 116 to engage the adjacent cores, the plastic is injected through the ejectors into the mold assembly. The interior surface 131 (FIG. 7) of each core track forms a stop surface immediately beneath recesses 126 to engage the head of the pin forcing the distal end of the pin against the adjacent core and limiting relative motion therebetween.

The temperature and pressure of the melt injected into the mold assembly depends upon the type of plastic utilized. Typically, the temperature of the polyolefin melt is 500° F. with the pressure exerted on the melt being between 1500 psi to 20,000 psi. In a typical embodiment, the pressure is maintained on the melt for six seconds allowing the melt to flow uniformly between the molds and between the cores. Thus, a through hole 18 is formed in each partition; however, immediate withdrawal of the additional locking members or pins 116 will cause the melt to flow into and eventually fill holes 18. As a result, the pin positions must be maintained for a period of time subsequent to the termination of the injection step. Typically, the pins 116 remain engaged with the adjacent cores for a period of approximately twenty-two seconds after the termination of the injection step. The pins 116 are then withdrawn and the container is ejected. A typical cycle for producing a battery case has a duration of thirty-five seconds with the first six seconds reserved for the injection of the plastic, the next twenty-two seconds reserved for the cooling of the melt while the pins 116 are in the extended outward position with the remaining seven seconds reserved for opening of the mold assembly, ejection of the container and reclosing of the mold assembly for the formation of the next container. It is therefore necessary to employ a timer to control not only the injection of plastic melt, but also the withdrawal of the locking pins 116.

Recess 126 has a gradually decreasing depth 136 adjacent head 131 to ease entry and exit of the head relative to the recess. The top of lifter 112 is flush with the top distal end of the core and thus the lifter must move vertically upward relative to the core in order to provide for the retraction of the side locking pins. Once the injection step is complete and the melt has cooled upon the conclusion of the aforementioned twenty-two second time period, the mold assembly is operable to withdraw the side cams 43 exposing the outside surface of the container. The floating plate 114 then forces the lifters 112 to move vertically upwardly along with the stripper plate 51 lifting the container upwardly relative to the cores. Eventually, heads 131 of pins 116 enter recess 126 with the lifters 112 then assuming a stationary position relative to the cores and with the stripper plates 51 continuing to move upwardly to remove the container off of the male mold. The top end of the lifters are engaged with the inside surface of the bottom wall of the container as the container is lifted upwardly past the pins 116. Once the partition wall of the container is lifted above the pins 116, the pins move back into the space between the cores as the lifters are lowered. A conventional timing means 140 (FIG. 5) is electrically connected to press 141 operable to control the flow of plastic melt to passage 91 and to maintain the melt pressure for the specified (six seconds) first time period. Further, the timing means 140 is connected to the cylinder which moves floating plate 114 (FIG. 6) and is operable to hold the plate 114 in the downward position until the aforementioned (twenty-two seconds) second time period was expired after which the plate 114 moves upwardly along with stripper plates 51 lifting the container. Eventually, pins 116 will be retracted allowing plates 51 to lift the container off of the core while plate 114 is stationary. Conventional cylinders are utilized for the movement of the floating plate with the cylinders being controlled by the timer. Further, conventional valving arrangements are provided in the press to activate the plastic melt flow once commanded by the timer.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A case mold assembly comprising:
   a frame;
   a female mold mounted on said frame and having a cavity for the plastic injection molding of a case;
   a male mold mounted on said frame and positionable into said female mold for a first time period for the formation of said case therebetween, said male mold including a plurality of cores located apart forming spaces, said cores having bottom ends mounted to said frame with said cores extendable into said cavity to form interior walls extending across said case upon said plastic injection;
   injection means operable to inject molten plastic between said female mold and said male mold and into said spaces and to maintain said plastic under pressure for a second time period of a duration less than said first time period;
   wedge lock means mounted to said female mold and extending between said cores and into said spaces operable to limit relative motion between cores during said plastic injection but being movable apart from said cores to allow said molten plastic under pressure to fill spaces vacated by said wedge lock means;
   a plurality of lifters slidable mounted on said cores and extending into said cavity;
   a plurality of pins mounted to said lifters and extending laterally across said spaces toward adjacent cores forming holes through said interior walls as said spaces between cores are filled with plastic;
   pin control means associated with said cores, said lifters and said pins being operable to cause said pins to extend outwardly into said spaces to form said holes within said walls and to allow said pins to withdraw into said cores from said spaces upon expiration of a third time period subsequent to said second time period; and,
   timing means operably associated with said injection means and said lifters and being operable to establish said second time period during which said pressure is maintained in said spaces and to establish said third time period during which said molten plastic cools to a non-flowable state and upon expiration thereof said lifters slide relative to said cores retracting said pins and forming said holes.

2. The assembly of claim 1 wherein:
   said pin control means includes springs mounted to said cores and engaged with said pins normally urging said pins out of said spaces but yieldable to allow movement of said pins into said spaces.

3. The assembly of claim 2 wherein:
   said cores include tracks slidably receiving said lifters with pin recesses located in said tracks to receive said pins as said lifters slide relative to said cores and said springs force said pins from said spaces.

4. The assembly of claim 3 wherein:
   said cores include stop surfaces adjacent said recesses with said stop surfaces contacting said pins, said springs yieldable allowing said stop surfaces to force said pins into said spaces and against adjacent cores and limiting relative motion between adjacent cores.

5. The assembly of claim 4 wherein:
   said pin control means includes a floating plate which has said lifters mounted thereto and further includes a stripper movably mounted to said frame which is positioned adjacent the battery case formed by the assembly, said male mold after said plastic injection has relative motion with respect to said lifters allowing said springs to move said pins out of said spaces and into said recesses.

6. The assembly of claim 5 wherein:
   said assembly includes one of said lifters with one of said pins for each of said interior walls.

7. The assembly of claim 6 wherein:
   said pins each include headed ends movable into said recesses and said springs include biased washers through which said pins extend with said washers positioned adjacent said headed ends.

8. A separable mold assembly for injection molding a plastic container having compartments separated by thin walls comprising:
   a male mold with deep longitudinal slots extending transversely thereacross forming a plurality of upstanding cores to form said compartments separated by said thin walls;
   a female mold having a cavity mounted adjacent said male mold and sized to receive said male mold for a first time period as plastic under pressure is injected therebetween to form said container;
   a plurality of lifters slidably mounted lengthwise to said cores and extendable into said cavity;
   a plurality of pins mounted to said lifters and movable into said slots once said male mold is positioned in said female mold with said pins extending between and contacting adjacent cores limiting relative motion between adjacent cores and also forming holes in said thin walls when said slots are filled with plastic;
   a plurality of wedge shaped fingers mounted to said female mold and movable into said slots as said female mold closes on said male mold to cooperatively with said pins limit relative motion between said cores as said pressure of said plastic is maintained for a second time period of a duration less than said first time period and further movable out of said slots to allow said plastic under pressure to fill said slots vacated by said fingers;

injector means mounted to said female mold and aligned relative to said cores to inject plastic material under pressure into said slots and between said female mold and said male mold;

control means associated with said pins and said cores and being operable to move said pins out of said slots and into said cores once said holes are formed and a third time period has elapsed subsequent to said injector means finishing the injection of plastic material into said slots; and, timing means operably associated with said injection means and said lifters and being operable to establish said second time period during which said pressure is maintained in said slots and to establish said third time period during which said plastic cools to a nonflowable state and upon expiration thereof said lifters slide relative to said cores retracting said pins and forming said holes.

9. The mold assembly of claim 8 wherein:
said lifters are movable further into said cavity after said injectors inject said plastic material with said lifters then carrying said pins out of said slots allowing separation of said female mold from said male mold.

10. The mold assembly of claim 9 wherein:
said cores include tracks slidably receiving said lifters and having pin recesses located in said tracks to receive said pins as said lifters slide relative to said cores.

11. The mold assembly of claim 10 wherein:
said cores include stop surfaces adjacent said recesses with said stop surfaces contacting said pins when said lifters are at a certain position relative to said cores, said control means include springs yieldable allowing said stop surfaces to force said pins into said slots and against adjacent cores limiting relative motion between adjacent cores.

12. A mold assembly adapted for the injection molding of thin-walled multi-partitioned containers comprising:
a cavity member;
a plurality of cantilever-mounted array of cores extending into said cavity member for a first time period;
injection means on said cavity member and adjacent the free ends of said cores for injection of plastic material under pressure during a secnd time period of duration less than said first time period into spaces between the cores and between the cavity member and the cores;
lifters slidably mounted lengthwise in said cores;
internal core locking members mounted on said lifters and reciprocally moveable in transverse bores formed in said cores intermediate their ends, said members being moveable within their bores from a retracted position substantially flush with the side faces of their respective cores to an extended position in locking engagement with the side faces of the next adjacent core limiting relative motion between adjacent cores while forming through holes in walls formed between said cores;
wedge lock means mounted to said cavity member and operable to extend between said cores limiting relative motion between cores as plastic under pressure flows between said cores but movable therefrom to allow said plastic to fill said spaces vacated by said wedge lock means; and,
time delay means to establish said second time period and a third time period being associated with said locking members and said injection means to delay retraction of said locking members until expiration of said third time period allowing said plastic to cool so the plastic injected between said cores will not flow into said holes upon removal of said locking members.

13. The assembly of claim 12 wherein:
said cores include tracks having lifters slidable mounted thereto, said lifters include said transverse bores carrying said internal core locking members, said cores further include springs means mounted to said locking members operable to normally retract said locking members into said cores but yieldable when said lifters are moved to a locking position relative to said cores for said cores to force said locking members outwardly against adjacent cores.

14. The assembly of claim 13 wherein:
said cores include stop surfaces adjacent said lifters with said stop surfaces contacting said locking members and providing an unyielding surface to force said locking members against adjacent cores and limit relative motion between adjacent cores.

15. The assembly of claim 8 wherein:
said pins include means for controlling the wall thickness of said thin walls surrounding said holes in said thin walls.

* * * * *